E. O. KEATOR.
CABLE COUPLING.
APPLICATION FILED AUG. 11, 1919.
1,375,519.
Patented Apr. 19, 1921.
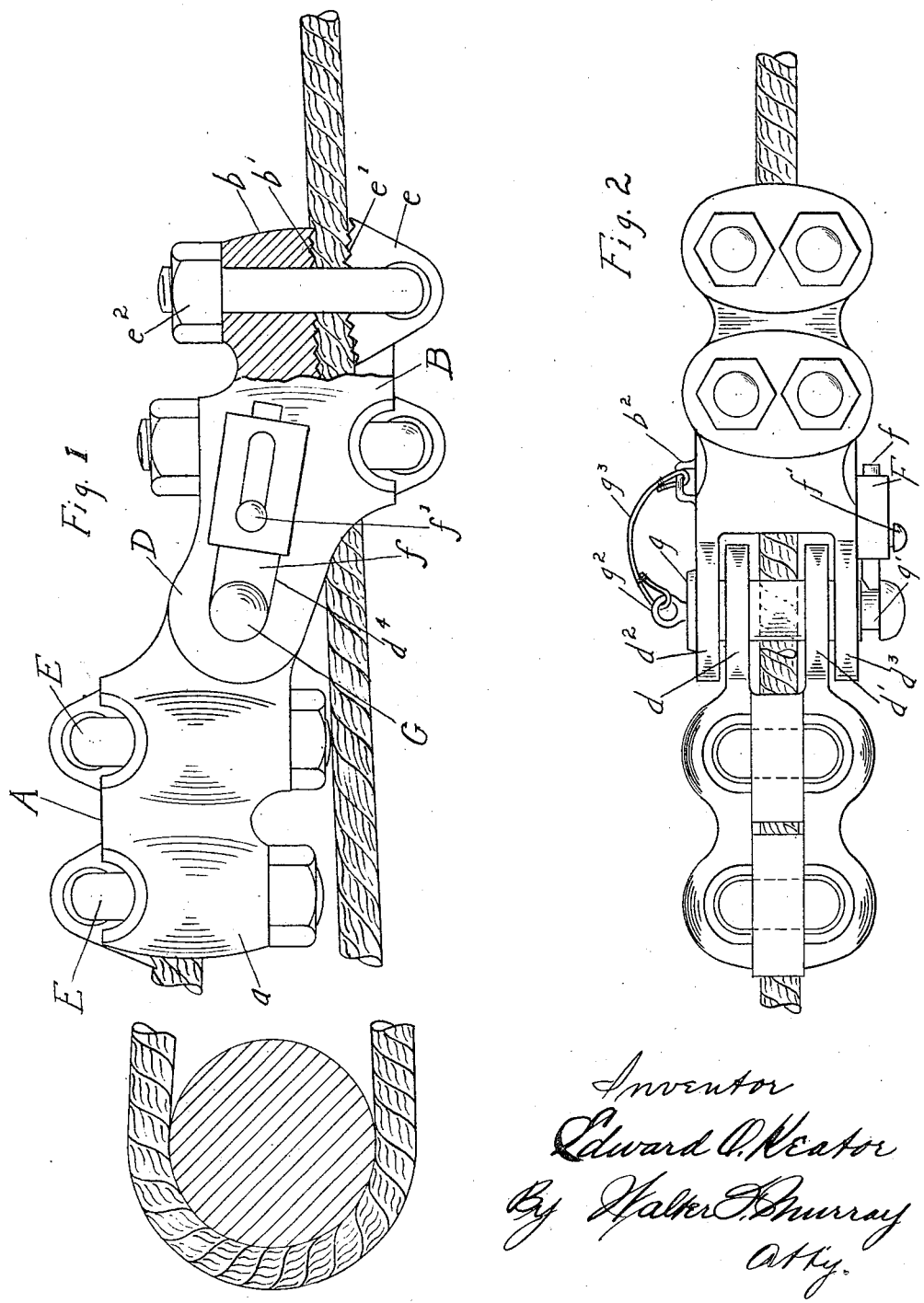

UNITED STATES PATENT OFFICE.

EDWARD O. KEATOR, OF DAYTON, OHIO.

CABLE-COUPLING.

1,375,519.   Specification of Letters Patent.   Patented Apr. 19, 1921.

Application filed August 11, 1919. Serial No. 316,800.

*To all whom it may concern:*

Be it known that I, EDWARD O. KEATOR, a citizen of the United States of America, and a resident of Dayton, in the county of Montgomery and State of Ohio, have invented a new and useful Improvement in Cable-Couplings, of which the following is a specification.

My invention relates to a cable coupling which is adapted for forming loops in wire cables and which may be used for coupling cables in other forms.

Wire rope is flexible to a certain extent but when clamped in a loop form by the means heretofore in use, it becomes set so rigidly that the loop cannot be changed in form without releasing the clamps.

The object of my invention is a cable coupling which may be opened and closed easily and which may be readily applied to the cable.

In the accompanying drawing forming a part hereof:

Figure 1, is a side elevation of a cable coupling embodying my invention, showing it in use in forming a loop in a cable.

Fig. 2, is a plan view of the coupling shown in Fig. 1.

The cable coupling embodying my invention comprises two clamps A and B, and a coupling member D which is adapted to connect the clamps.

The clamps comprise a body $a$, $b$, through which there is a longitudinal way, through which a cable is adapted to be passed and which has upon one of its faces a series of teeth such as teeth $b'$. Through the bodies $a$, $b$, are a series of transverse bores in which are seated U bolts E. Upon the bend of each U bolt is rotatably mounted a cam $e$ each of which has a serrate face $e'$ which when the nuts $e^2$ upon the U bolts are tightened, are drawn into a cable which is located in the longitudinal way and which coöperate with the teeth upon opposite sides of the way in gripping the cable and holding the clamp thereon.

The coupling D consists of two integral fingers $d$, $d'$ projecting from the end of body $a$, and fingers $d^2$, $d^3$, projecting from the body $b$. These fingers have in them registering slots $d^4$ which are adapted to receive the coupling pin G, which has at one of its ends a boss $g$ which is adapted to bear against the outer face of finger $d^2$, and at its other end an annular slot $g'$ which is adapted to be engaged by the bolt $f$ of a spring catch F. The bolt $f$ has a pin $f'$ by means of which it may be moved against the tension of the spring, not shown. To prevent the pin from becoming lost when not in use, I have provided eyelets $g^2$, $b^2$, upon the pin and the side of the body $b$ through which wire $g^3$ is secured.

In use, clamps A and B are secured at the desired place upon a cable or cables, by passing the cable through the longitudinal ways and then tightening the nuts on the U bolts so as to cause the clamps to contact with the surface of the cable. When so clamped strain upon the cable from either direction tends to rotate the cams upon the U bolts and to draw them more firmly into contact with the cable. The clamps are coupled together by bringing the arms $d$, $d'$, $d^2$, $d^3$ into position to cause the slots therein to register so as to receive the pin G. When the pin is pushed through the slot the beveled end of the bolt $f$ contacting with the rounded head of the pin, causes the bolt first to be retracted to pass the head, and then to spring into the slot $g'$.

Uncoupling of the clamps is effected by disengaging the bolt $f$ from the pin G and by releasing the pin from the arms of the coupling.

What I claim is:—

1. A cable-coupling comprising two clamps, a coupling, the clamps consisting of body portions with longitudinal cable receiving ways, U bolts and cams mounted upon the U bolts and projecting into the ways, and the coupling having one of its members secured to one of the clamps and its coöperating member secured to the other clamp, and a removable pin connecting the coupling members.

2. A cable-coupling comprising two clamps and a coupling, the coupling consisting of transversely slotted arms projecting from the clamps, a pin adapted to seat in the slots and a catch adapted to engage the pin.

3. An article of manufacture comprising a body portion with a longitudinal cable receiving slot, clamping devices mounted upon the body and adapted to clamp a cable in the slot, and a member of a coupling secured to the body, the coupling member having a transverse slot through which a pin may be passed.

4. An article of manufacture comprising a body portion with a longitudinal cable receiving slot, clamping devices mounted upon the body and adapted to clamp a cable in the slot, and a member of a coupling secured to the body and a spring actuated locking device mounted upon said member.

In testimony whereof, I have hereunto subscribed my name this 9th day of August, 1919.

EDWARD O. KEATOR.